United States Patent [19]

Abecassis

[11] Patent Number: 5,291,395
[45] Date of Patent: Mar. 1, 1994

[54] WALLCOVERINGS STORAGE AND RETRIEVAL SYSTEM

[76] Inventor: Max Abecassis, 19020 NE. 20th Ave., Miami, Fla. 33179

[21] Appl. No.: 651,810

[22] Filed: Feb. 7, 1991

[51] Int. Cl.⁵ .............................................. G06F 15/24
[52] U.S. Cl. ..................................... 364/401; 364/403
[58] Field of Search ............... 364/400, 401, 403, 522, 364/900, 408, 478, 479; 434/72, 80, 96, 98; 235/383, 385

[56] References Cited

U.S. PATENT DOCUMENTS

| | | | |
|---|---|---|---|
| 3,568,155 | 4/1967 | Abraham et al. | 340/172.5 |
| 3,757,037 | 9/1973 | Bialek | 364/900 |
| 4,318,121 | 3/1982 | Taite et al. | 358/22 |
| 4,484,288 | 11/1984 | Riemenschneider | 364/478 |
| 4,679,149 | 7/1987 | Merz | 364/478 |
| 4,786,229 | 11/1988 | Henderson | 414/786 |
| 4,796,209 | 1/1989 | Burk | 364/559 |
| 4,860,123 | 8/1989 | McCalley et al. | 358/342 |
| 4,887,208 | 12/1989 | Schneider | 364/403 |
| 4,931,929 | 6/1990 | Sherman | 364/401 |
| 4,949,257 | 8/1990 | Orbach | 364/401 |
| 5,011,411 | 4/1991 | Loewy | 434/96 |

OTHER PUBLICATIONS

*Advertising Age* vol. 56 No. 90 Nov. 18, 1985 "Retailers Beginning to Tune in Video Displays".
"Touchcom Interactive Videodisc Catalog Markets Furmhure at Dayton's" News and Notes—*Videodisc* Oct. 1985.
Touchcom "The Future of Communication" Digital Techniques Inc. 1985.
*New Home* "From Lumberyards to Paint Stores Design Computers Make Choices Easier Home Videos" May/Jun. 1990.

*Primary Examiner*—Roy N. Envall, Jr.
*Assistant Examiner*—Andrew Bodendorf
*Attorney, Agent, or Firm*—Hoffman, Wasson & Gitler

[57] ABSTRACT

A system and method for presenting, selecting and retrieving actual samples of wallcoverings based upon selected criteria generated by the user. The user is provided with an input card or brochure listing a number of design characteristics. This input card or brochure includes a chart of color-range cells, each cell representing a range of shades of a base color. Based upon these characteristics, the system would produce a listing of all design patterns, such as wallcoverings which meet these characteristics. The computer system would generate a listing of these patterns. Additionally, the system could include a warehouse/storage facility operatively connected to the computer so as to physically provide the user with the design patterns which were chosen.

16 Claims, 3 Drawing Sheets

WALLCOVERINGS STORAGE AND RETRIEVAL SYSTEM

BACKGROUND OF THE INVENTION

The present invention relates generally to the presentation, selection and retrieval of samples of wall-coverings, such as wallpaper. However, the teachings of the present invention can be extended to cover the storage and retrieval of any design provided on a fabric or similar backing.

Presently, the retailing of wallcoverings (wallpapers, borders, fabrics, etc.) is based upon customers searching through wallcovering books provided at a central location, such as a retail outlet, the books containing samples of wallcoverings. Often, this searching occurs within a dismal retail environment, where the store layout, storage and display of the wallcovering books suffers from the same neglect and shortcomings as the wallcovering books themselves.

Each central location is provided with approximately 200 to over 1,000 books, with each book including from 30 to over 100 samples. A specialized wallcovering store having a competitive selection of books would contain approximately 70,000 wallcovering samples. Stores claiming over 1,000 books would have over 100,000 wallcovering samples. These assortments are continually changed as old books are discontinued and new books added.

The books themselves are supplied by the various wallcovering manufacturers and distributors. Each vendor tends to include patterns in each book based on a general theme and/or style. This loose unstructured grouping of patterns would often mean that the customer would have to at least peruse, if not examine, each book.

The customer's task of reviewing each of the store's assortment of patterns may be somewhat facilitated by a knowledgeable salesperson and, by either, excluding or only including the books designed primarily for children's rooms and/or other marginal books. However, in practice, since each store does not include a comprehensive collection of wallcovering books, the prudent customer would be forced to visit many stores and examine many books before selecting a particular wallcovering.

U.S. Pat. No. 4,931,929, issued to Sherman, attempts to solve the problem of forcing an individual to search through many books of wallcoverings before a final selection can be made. This patent is directed to a process for the identification, description and display, on a video monitor, of design components, such as interior decoration products, selected by inputting desired component characteristics to a digital computer. However, while a highly trained decorator may be able to make a final selection of a wallcovering based upon a video image of the wallcovering, most retail customers would not be able to make such a decision. Rather, most customers would be better served by the opportunity to view and touch an actual sample of the wallcovering and perhaps borrow the sample to review in their home. This is important, since presently, most customers would, if possible, borrow a number of books from the retail store so that they can judge how a particular pattern would match with the actual decor of the house of a particular room. Even if the customer is interested in only one wallcovering from a particular book, they are forced to borrow the entire book to make such an assessment.

Additionally, the patent to Sherman indicates that color can be one of the desired component characteristics which can be relayed to the digital computer. Although this is the case, the treatment of color by Sherman is based on a single most dominant color, and up to five sub-dominant color references for each wallcovering. This attempt to establish a dominant color indicates a fundamental failure in the understanding of the use of color in the design of the wallcovering art. Furthermore, Sherman uses a machine-readable color input means which indicates that the colors are digitized quantities of hue, chroma and value so that each color falls within a predetermined block of color coordinates. The use of a color analyzer as part of the process to produce a color match to a required color is an enhancement when the product's ability to match the desired color has an effective equivalent color spectrum, such as when one is matching paints. However, in the case of ready-made wallcoverings, this scenario would prove to be ineffective. For example, if we were to limit the technically possible number of background colors to a fraction of the possible range of colors, e.g. 1,000, and then do the same for the foreground color, and select from among 40 possible motifs and among five possible motif styles and five possible motif patterns, we would require an assortment of approximately 1 billion patterns to ensure at least one match for every possible combination. Even if we were to limit the number of colors to 100, we would require an assortment of approximately 10 million patterns. This should be contrasted to the typically well stocked store which provides approximately 100,000 patterns.

Therefore, based upon the foregoing, a new method and system for choosing wallcoverings or other fabrics containing a particular pattern thereon should be developed and implemented.

SUMMARY OF THE INVENTION

The deficiencies of the prior art are overcome by the present invention which is directed to a method and system for creating a set of wallcovering outputs based upon inputting information relating to particular styles, patterns, motifs and colors which should be included in the wallcovering. These particular criteria are inputted into a computer in the usual manner. The output which is produced could consist of one or more numbers which refer to samples of wallcoverings provided on individually mounted carriers. The customer would then take these numbers to a storage section in the retail establishment and would be able to physically examine and borrow these samples of the wallcoverings. Alternatively, the computer could be connected to a warehousing unit for the storage of these individually mounted wallcovering carriers. Therefore, based upon the input introduced to the computer, the customer would be provided with a listing of the wallcoverings which met the customer's criteria along with the carriers themselves provided with the particular wallcoverings thereon.

Furthermore, with respect to the choice of color, the customer would be provided with a color chart having a plurality of color cells thereon. Each of the color cells is provided with a base color modified as to its shade or tint so as to represent a range of shades of a color. Each color-range cell is differentiated from another cell through variations of hue, shade and/or tint. This differs from the color samples that are readily available, such as paint samples which represent a uniform solid color.

These additional features and advantages of the present invention would become further apparent from the following detailed description thereof which is to be read with reference to the accompanying drawings.

DETAILED DESCRIPTION OF THE PRESENT INVENTION

Figure 1:
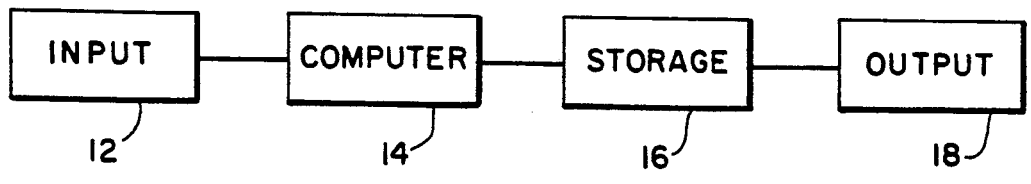
FIG. 1 is a block diagram of the present invention.

The present invention is directed to a method and apparatus for providing the consumer with a number of wallcovering options based upon a number criteria which are chosen by the consumer. This system 10 is described with respect to FIG. 1 which includes a computer 14 having an input device 12. This input device could consist of a keyboard, an input disc, a means for visually inputting data, or the like. Once this data is introduced to the computer 14, data storage information and software programs provided in the computer's memory would be utilized to provide an output indicating the set of possible wallcoverings which would meet the customer's criteria. The data storage would include information relating to all of the wallcoverings which are on file. The output might be in the form of a computer printout which would list a particular stock number or numbers which would meet the criteria developed by the customer. At this point, the customer or a salesperson would be able to retrieve the various wallcoverings based upon this stock number.

Figure 2:
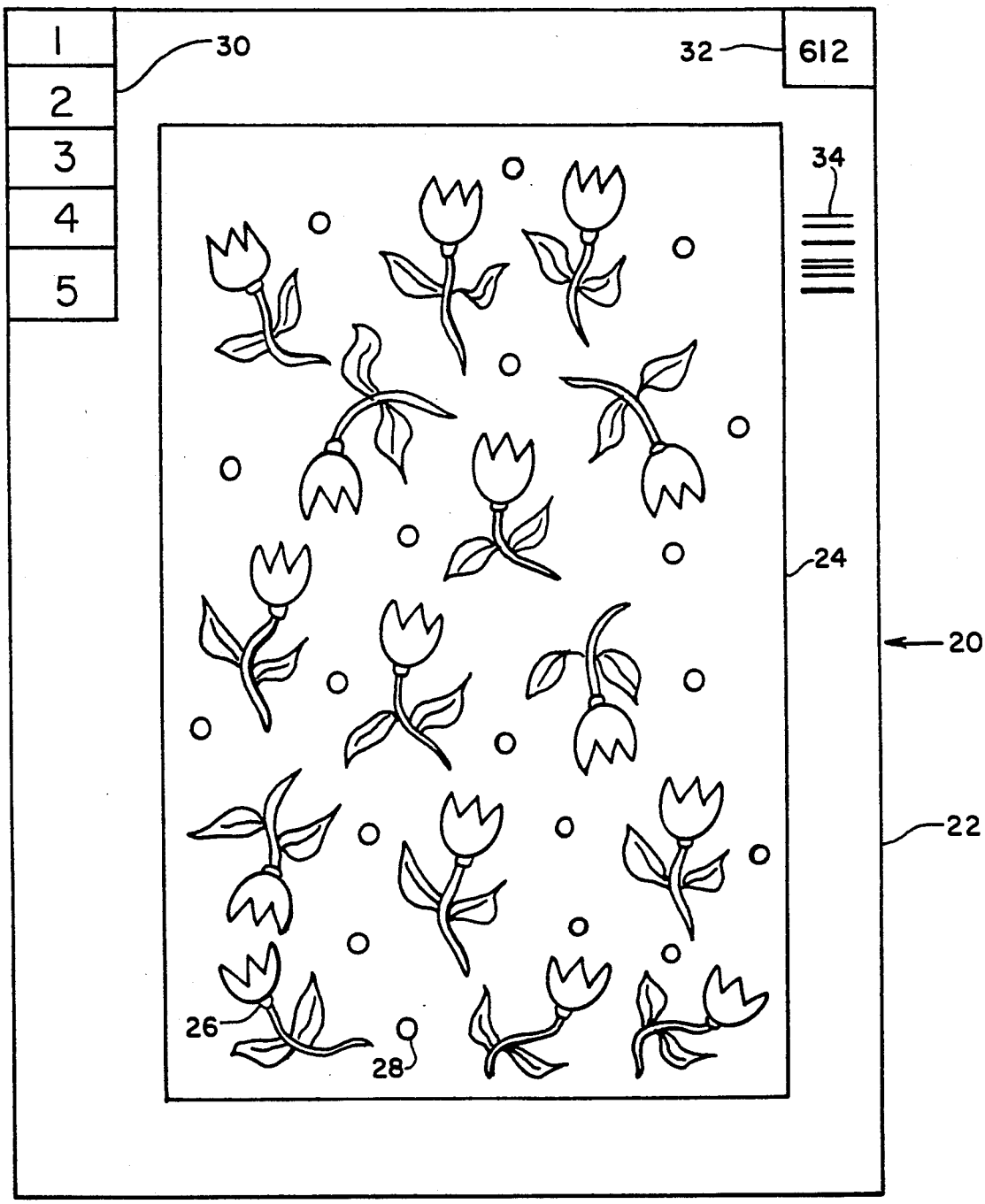
FIG. 2 is a front view of the wallcovering carrier provided with a wallcovering thereon.

A typical wallcovering carrier 20 is illustrated with respect to FIG. 2. Each of these wallcoverings 24 would be individually mounted on a carrier 22 made of paperboard, or other suitable materials which would be sturdy enough to stand on its end. The carriers would have such dimensions of height and width so as to provide for the display of the wallcoverings repeat. Utilizing one of the numeric color-coded file label systems, a unique storage and retrieval number 32 is assigned to each wallcovering and affixed to the carrier. Additional numbers 30 could also be affixed to the carrier 22, each number representing a particular color, style, pattern or motif. For example, wallcovering 24 contains a plurality tulips 26 and a plurality of circles 28. Each of these designs or patterns would be assigned a particular number. Additionally, these numbers could also represent various objective information, such as vendor and book identity, physical dimensions, how the wallcovering is packaged, physical characteristics such as washability and material composition, pattern of the art such as repeated match.

Although the present invention should not be so limited, one type of input means would take the form of a brochure containing all of the possible objective characteristics of the wallcovering as well as the subjective characteristics of style, pattern, motif as well as color. Each of these characteristics is assigned a particular input number or code which is then transmitted and introduced to the computer.

Figure 3:
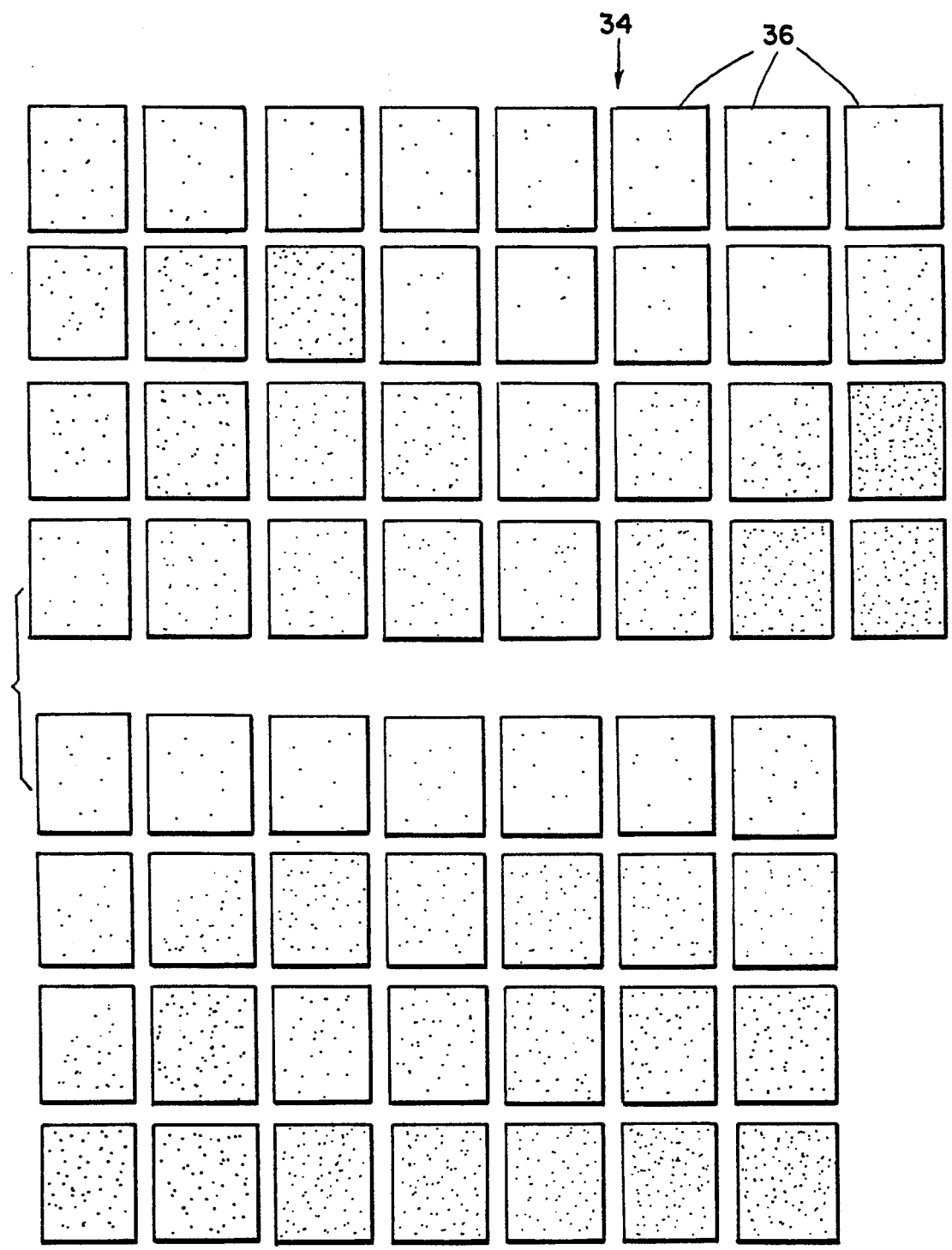
FIG. 3 is a front view of a color range wall chart according to the present invention.

FIG. 3 illustrates a portion 34 of this brochure which represent the colors available to the customer. In this instance, the color chart includes a number of color-range cells 36, each cell provided with a base color modified as to its shade or tint so as to represent a range of shades of a particular color. The use of this color chart would allow the customer to choose a range of colors and not be forced to choose only a single color, which would hinder the development of an acceptable number of wallcoverings. This computerized system employs a particular schema designed to specifically accommodate the requirements of wallcoverings as art and support the inclusion of the subjective as well as objective information in a nonlimiting structure. These schema incorporates a relational database system and makes extensive use of parent (e.g. design) and children (e.g. element) relationships.

It is this aspect of this component of the invention that permits the assignment of a non-definitive and often contradictory set of elements for a wallcovering. For example, a wallcovering having design including intersecting squares, might be assigned the following elements from the motif category: squares, triangles, four-sided figures, geometrics, etc.

Since the objective information provided to the consumer as indicated previously as well as the subjective information of the wallcovering, such as background color, foreground/motif color, motif, motif style, motif pattern, motif size, etc. are not standard, the schema structure of the database and related software is designed to provide for new categories of attributes, new elements within the categories, and an undefined number of elements that can be assigned within each category to each wallcovering without the need to modify the schema and the information entry and retrieval software.

The number or numbers 30 assigned to each wallcovering will be based on an analysis of the design attributes of each wallcovering. This allows storage and retrieval of a wallcovering by specifying any combination of subjective and objective requirements with any desired level of specificity. For example, stylized red roses and yellow squares arranged in a vertical pattern on a white ground.

Although not complete, the following is a core of the schema as it relates to the present invention and should not be construed as a full listing as it will be implemented in a retail store setting.

| TABLE/ FIELD | REF | TYPE | LENGTH | LONG NAME |
|---|---|---|---|---|
| vendor | | | | vendor |
| | *vencod | STRING | 6 | vendor |
| | ven-nam | STRING | 30 | name |
| | vendba | STRING | 30 | dba |
| | venadd | STRING | 30 | address |
| | vencit | STRING | 20 | city |
| | vensta | STRING | 2 | state |
| | venzip | STRING | 5 | zip |
| | venpri | STRING | 25 | principal |
| | venp-ph | STRING | 12 | pri-phone |
| | venrep | STRING | 25 | rep |
| | venrph | STRING | 12 | rep-phone |
| | venapc | STRING | 25 | ap-contact |
| | venapp | STRING | 12 | ap-phone |
| | venour | STRING | 20 | our-acc |
| | vengla | STRING | 5 | gl-acc |
| | venssn | STRING | 11 | ss-number |
| | venfid | STRING | 10 | fid |
| | venfac | STRING | 3 | factor |
| | ventyp | STRING | 3 | type |

-continued

| TABLE/FIELD | REF | TYPE | LENGTH | LONG NAME |
|---|---|---|---|---|
| book | | | | book |
| *boocod | | STRING | 6 | book |
| booven | vencod | STRING | 6 | vendor |
| boonam | | STRING | 25 | name |
| boovno | | STRING | 10 | number |
| boorec | | DATE | | received |
| boodis | | DATE | | discon |
| price | | | | price |
| priboo | boocod | STRING | 6 | book |
| pricod | | STRING | 3 | price-code |
| pricos | | AMOUNT | 2 | cost |
| priret | | AMOUNT | 2 | retail |
| pripri | | AMOUNT | 2 | price |
| type | | | | type |
| *typcod | | STRING | 5 | type |
| typdes | | STRING | 15 | descr |
| material | | | | material |
| *matcod | | STRING | 5 | material |
| matdes | | STRING | 15 | descr |
| matcom | | STRING | 15 | composition |
| matstr | | STRING | 1 | strip |
| mattri | | STRING | 1 | trimmed |
| matpas | | STRING | 1 | pasted |
| matwas | | STRING | 1 | wash |
| matfas | | STRING | 1 | fastness |
| matadh | | STRING | 4 | adhesive |
| surface | | | | surface |
| *surcod | | STRING | 5 | surface |
| surdes | | STRING | 15 | descr |
| brillance | | | | brillance |
| *bricod | | STRING | 5 | brillance |
| brides | | STRING | 15 | descr |
| match | | | | match |
| *mchcod | | STRING | 5 | match |
| mchdes | | STRING | 15 | descr |
| category | | | | category |
| *catcod | | STRING | 4 | category |
| catdes | | STRING | 15 | descr |
| element | | | | element |
| *elecod | | STRING | 5 | element |
| elecat | catcod | STRING | 4 | category |
| eledes | | STRING | 15 | descr |
| number | | | | number |
| *numpri | | STRING | 5 | primary |
| numsec | | STRING | 5 | secondary |
| numnum | | NUMERIC | 7 | number |
| coord | | | | coord |
| *coocod | | NUMERIC | 7 | coord |
| design | | | | design |
| *descod | | NUMERIC | 7 | design |
| desboo | boocod | STRING | 6 | book |
| despag | | STRING | 3 | pages |
| desnam | | STRING | 20 | name |
| desnum | | STRING | 12 | number |
| descol | | STRING | 15 | color |
| despcd | | STRING | 3 | price-code |
| despri | | AMOUNT | 2 | price |
| desver | | AMOUNT | 2 | vertical |
| deshor | | AMOUNT | 2 | horizontal |
| desmch | mchcod | STRING | 5 | match |
| deswid | | AMOUNT | 2 | wide |
| deslen | | AMOUNT | 2 | length |
| deswei | | AMOUNT | 2 | weight |
| despac | | NUMERIC | 2 | packaged |
| desmin | | NUMERIC | 2 | minimum |
| descus | | AMOUNT | 2 | custom-charge |
| destyp | typcod | STRING | 5 | type |
| desmat | matcod | STRING | 5 | material |
| dessur | surcod | STRING | 5 | surface |
| desbri | bricod | STRING | 5 | brillance |
| desmot | | AMOUNT | 2 | motif-size |
| descoo | coocod | NUMERIC | 7 | coord |
| desele | | | | desele |
| dedecd | descod | NUMERIC | 5 | design |
| deelcd | elecod | STRING | 5 | element |
| cust | | | | cust |
| *cuscod | | STRING | 12 | phone |
| cuspre | | STRING | 6 | prefix |
| cusla | | STRING | 15 | lat-name |
| cusfir | | STRING | 15 | first-name |
| cusadd | | STRING | 30 | address |
| cuscit | | STRING | 25 | city |
| cussta | | STRING | 2 | state |
| cuszip | | STRING | 5 | zip |
| cuscty | | STRING | 3 | card-type |
| cuscnu | | STRING | 25 | card-no |
| custyp | | STRING | 1 | cust-type |
| firm | | | | firm |
| fircod | cuscod | STRING | 12 | firm |
| firnam | | STRING | 30 | name |
| firdba | | STRING | 30 | dba |
| firssn | | STRING | 11 | ss-number |
| firfid | | STRING | 10 | fid |
| firtax | | STRING | 10 | tax |
| search | | | | search |
| *seacod | | NUMERIC | 5 | search |
| seacus | cuscod | STRING | 12 | cust |
| seadat | | DATE | | day |
| seatim | | TIME | | times |
| seaprb | | AMOUNT | 2 | beg-price |
| seapre | | AMOUNT | 2 | end-price |
| searep | | AMOUNT | 2 | repeat |
| seamch | mchcod | STRING | 5 | match |
| seatyp | typcod | STRING | 5 | type |
| seamat | matcod | STRING | 5 | material |
| seasur | surcod | STRING | 5 | surface |
| seabri | bricod | STRING | 5 | brillance |
| seamsz | | AMOUNT | 2 | motif-size |
| seaele | | | | seaele |
| sesecd | seacod | NUMERIC | 5 | search |
| seelcd | elecod | STRING | 5 | element |

The architecture of the above schema provides for a potentially exhaustive list of categories and elements that can be entered in the database, and that can be tuned at any time to achieve any level of complexity.

The following suggested list of categories and elements attempts to balance the desire to expand the list with the requirements of ease of use and maintenance to achieve the most productive retrieval of the designs matching the required elements.

Noted below are also some of the possible modifications in the entries.

| TYPE | |
|---|---|
| type | descr |
| paper | Papers |
| borde | Borders |
| fabri | Fabrics |
| poste | Posters |
| bedsh | Bed Sheets |
| bedsh | Bed Covers |

Note: May include most home furnishings products and/or any other product containing elements of design.

| SURFACE | |
|---|---|
| surface | descr |
| smoot | Smooth |
| light | Light |
| mediu | Medium |

|  |  |
|---|---|
| heavy | Heavy |

Note:
A more rigorous measurement or description of the surface texture of the product, may be utilized.

BRILLANCE

| brillance | descr |
|---|---|
| dullb | Dull Brillance |
| lowbr | Low Brillance |
| mediu | Medium Brillance |
| highb | High Brillance |

Note:
A more technical measurement of brillance may be utilized.

MATCH

| match | descr |
|---|---|
| rando | Random |
| acros | Across |
| half | Half Drop |
| multi | Multiple Drop |

CATEGORY

| category | descr |
|---|---|
| back | Background |
| fore | Foreground |
| moti | Motif |
| patt | Pattern |
| styl | Style |

Note:
The Motif category may be expanded to include a separate category for foreground motif, and/or background motifs.

ELEMENT

| element | category | descr |
|---|---|---|
| diago | patt | Diagonal |
| diffu | patt | Diffused |
| freef | patt | Freeform |
| horiz | patt | Horizontal |
| solid | patt | Solid |
| verti | patt | Vertical |
| conte | styl | Contemporary |
| tradi | styl | Traditional |
| count | styl | Country |
| nurse | styl | Nursery |
| child | styl | Children |

Note:
The elements in the category style can be expanded to include a more detailed breakdown of style, period, and cultural or geographic identity.

ELEMENT

| element | category | descr |
|---|---|---|
| abstr | moti | Abstracts |
| airpl | moti | Airplanes |
| anima | moti | Animals |
| berri | moti | Berries |
| birds | moti | Birds |
| blend | moti | Blends |
| block | moti | Blocks |
| bows | moti | Bows |
| brush | moti | Brushstrokes |
| chick | moti | Chickens |
| cloud | moti | Clouds |
| clown | moti | Clowns |
| dots | moti | Dots |
| farms | moti | Farms |
| flowe | moti | Flowers |
| geome | moti | Geometrics |
| grape | moti | Grapes |
| heart | moti | Hearts |
| kitch | moti | Kitchens |
| laces | moti | Laces |
| leave | moti | Leaves |
| lette | moti | Letters |
| milit | moti | Military |
| paisl | moti | Paisleys |
| peopl | moti | Peoples |
| plaid | moti | Plaids |
| plast | moti | Plaster |
| roses | moti | Roses |
| scall | moti | Scallops |
| shape | moti | Shapes |
| shell | moti | Shells |
| ships | moti | Ships |
| spray | moti | Spray Flower |
| squar | moti | Squares |
| stars | moti | Stars |
| stick | moti | Sticks |
| strip | moti | Stripes |
| tiedy | moti | Tyedye |
| train | moti | Trains |
| trend | moti | Trends |
| truck | moti | Trucks |
| weath | moti | Weathervanes |
| Zigza | moti | ZigZag |

ELEMENT

| element | category | descr |
|---|---|---|
| 12345 | back | Background Color |
| 12345 | fore | Foreground Color |

The Codes of background and foreground color elements are systematized as follows:

| LEVEL 1 | Character | Use | Values | Descr |
|---|---|---|---|---|
|  | 23 | Chroma | bl | Blue |
|  |  |  | gr | Green |
|  |  | re | Red |  |
|  |  |  | ye | Yellow |
|  |  |  | or | Orange |
|  |  |  | re | Red |
|  |  |  | pu | Purple |
| Level 2 | Character | Use | Values | Descr |
|  | 234 | Hue | blp | Blue-Purple |
|  |  |  | blu | Blue |
|  |  |  | blg | Blue-Green |
|  |  |  | gre | Green |
|  |  |  | yeg | Yellow-Green |
|  |  |  | yel | Yellow |
|  |  |  | yeo | Yellow-Orange |
|  |  |  | ora | Orange |
|  |  |  | reo | Red-Orange |
|  |  |  | red | Red |
|  |  |  | rep | Red-Purple |
|  |  |  | pur | Purple |
|  |  |  | bro | Brown |
|  |  |  | gra | Gray |
|  |  |  | whi | White |
|  |  |  | bla | Black |
|  |  |  | gol | Gold |
|  |  |  | sil | Silver |
|  |  |  | cop | Copper |
|  |  |  | brz | Bronze |
| Level 3 | Character | Use | Values | Descr |
|  | 1 | Shade | w | White |
|  |  |  | 1 | Light |
|  |  |  | m | Medium |
|  |  |  | d | Dark |
|  | Character | Use | Values | Descr |
|  | 5 | Background | b | Background |
|  | 5 | Foreground | f | Foreground |

Level 4 or higher of color can be incorporated by:
1) providing for additional hues
2) providing for additional shades/tints The present invention can be implemented in both a retail store environment as well as a "shop at home" environment. The customer is provided with a specially designed brochure incorporating the wallcoverings database architecture and included a specially designed color-ranged cell chart. The customer would then enter in a manner known in the art the particular subjective and/or objective choices for the particular wallcovering that is desired. If a customer is at the retail establishment, these choices would be directly entered into the computer. Alternatively, the customer may mail the brochure with the entered choices directly to the store or may phone in his or her choices. Once the individually mounted wallcovering samples are retrieved, the customer may elect to visit the store to review them to greatly reduce the time required for the customer to find a wallcovering that meets their requirements.

The output generated by the computer can take two forms. The first form would consist of a computer output indicating the name and title of the wallpaper chosen along with its specific number 32. At this point, the customer or the sales clerk would obtain the wallcovering or wallcoverings generated by the computer, these wallcoverings provided on their own specific carriers.

Alternatively, the computer itself may be connected to a storage or warehousing system 16 in which the particular wallcovering carriers 20 are housed. Therefore, based upon the computer output generated by the computer, the computer system would automatically retrieve the particular wallcovering carriers which are directly provided to the customer. Additionally, if done by mail, these wallcovering carriers can be directly mailed to the respective customer.

Although the invention has been illustrated and described with reference to the preferred embodiments described herein, it is to be understood that it is no way limited to the details of such embodiments, but is capable of numerous modifications within the scope of the appended claims. For instance, the present invention, while ideally suited to the wallpaper industry, has an application in other areas such as bedcoverings, floor coverings, and other home furnishing; fabrics; and many other commercially printed products that have graphical or design elements such as posters, ties, stamps, etc.

What is claimed is:

1. A system for storing and retrieving one or more physically textured pattern materials, said materials each provided with at least one design characteristic, comprising:
   an input device provided with a comprehensive listing of design characteristics, allowing an individual to limit the said comprehensive listing of design characteristics to a grouping of design characteristics less in number than said comprehensive listing of design characteristics;
   a computer provided with a database containing said comprehensive listing of design characteristics and software for determining which of a plurality of design patterns corresponding to the physically textured pattern materials satisfy a particular criteria based upon said grouping of design characteristics inputted to said computer, said computer generating a listing of design patterns which satisfy said particular criteria based upon said grouping of design characteristics inputted to said computer, each design pattern corresponding to a physically textured pattern material; and
   a storage location associated with said system containing said physically textured pattern materials, each of said physically textured pattern materials associated with a specific indicia and each of said physically textured pattern materials being separated from other physically textured pattern materials, said listing of design patterns and said specific indicia utilized to retrieve said physically textured pattern materials.

2. The system in accordance with claim 1 wherein each of said physically textured pattern materials is provided within individual carriers provided with said indicia.

3. The system in accordance with claim 1 wherein said comprehensive listing of design characteristics includes color characteristics.

4. The system in accordance with claim 3, wherein said input device is provided with a plurality of color cells, each color cell displaying a base color blended with tints or shades of the base color to create a continuum of said base color.

5. The system in accordance with claim 1, wherein said storage location is directly connected to said computer, allowing automatic retrieval of said physically textured pattern materials based upon said grouping of design characteristics inputted to said computer.

6. A system for storing and retrieving one or more design patterns, each of said design patterns provided with at least one design characteristic, comprising:
   an input device provided with a comprehensive listing of design characteristics, allowing an individual to limit said comprehensive listing of design characteristics to a grouping of design characteristics less in number than said comprehensive listing of design characteristics, said comprehensive listing of design characteristics including a plurality of color cells, each color cell displaying a base color blended with tints or shades of the base color to create a continuum of said base color;
   a computer provided with a database containing a comprehensive listing of design characteristics and software for determining which of a plurality of design patterns satisfy a particular criteria based upon a grouping of design characteristics inputted to said computer, said computer generating a listing of design patterns which satisfy said particular criteria based upon said grouping of design characteristics inputted to said computer, each design pattern corresponding to a physically textured pattern materials, said listing of design patterns and said specific indicia utilized to retrieve said physically textured pattern materials.

7. The system in accordance with claim 6 wherein said design patterns are physically textured pattern materials.

8. The system in accordance with claim 7, wherein said physically textured pattern materials are provided within individual carriers.

9. The system in accordance with claim 8, wherein each of said individual carriers are provided with indicia representing the type of design characteristics embodied in said design characteristics.

10. The system in accordance with claim 7, wherein said physically textured pattern materials represent wall coverings.

11. The system in accordance with claim 6, wherein said storage location is directly connected to said computer, allowing automatic retrieval of said physically textured pattern materials based upon said grouping of design characteristics inputted to said computer.

12. A method of selecting and retrieving particular physically textured pattern materials, said materials each provided with at least one design characteristic, comprising the steps of:
   providing a computer system having a database containing a comprehensive listing of design characteristics and software for determining which of a plurality of design patterns corresponding to the physically textured pattern materials satisfy a particular criteria based upon a grouping of design characteristics inputted to said computer;

choosing, from said comprehensive listing of design characteristics provided on an input device, a grouping of design characteristics less in number than said comprehensive listing of design characteristics;

inputting said grouping of design characteristics to said computer;

providing a listing of design patterns which satisfy said grouping of design characteristics;

retrieving one or more of said physically textured pattern materials based upon said listing of design patterns, each of said design patterns corresponding to one of said physically textured pattern materials and each of said physically textured pattern materials being separated from other physically textured pattern materials.

13. The method in accordance with claim 12, wherein each of said physically textured pattern materials are provided within individual carriers.

14. The method in accordance with claim 12 wherein said comprehensive listing of design characteristics include color characteristics.

15. The method in accordance with claim 14, wherein said comprehensive listing of design characteristics includes a plurality of color cells, each color cell displaying a base color blended with tints or shades of the base color to create a continuum of said base color.

16. A method of selecting and retrieving one or more wall coverings mounted in individual carriers, each of said wall coverings mounted in individual carriers provided with at least one design characteristics, comprising the steps of:

providing a computer system having a database containing a comprehensive listing of design characteristics and software for determining which of a plurality of wall coverings mounted in individual carriers satisfy a particular criteria based upon a grouping of design characteristics inputted to said computer;

choosing, from said comprehensive listing of design characteristics provided on an input device, a grouping of design characteristics less in number than said comprehensive listing of design characteristics;

inputting said grouping of design characteristics to said computer;

providing a listing of the wall coverings mounted in the individual carriers which satisfy said grouping of design characteristics;

retrieving the wall coverings mounted in the individual carriers contained on said listing each of said wall coverings mounted in the individual carriers.

* * * * *

UNITED STATES PATENT AND TRADEMARK OFFICE
CERTIFICATE OF CORRECTION

PATENT NO. : 5,291,395

DATED : March 1, 1994

INVENTOR(S) : Max Abecassis

It is certified that error appears in the above-indentified patent and that said Letters Patent is hereby corrected as shown below:

In column 10, claim 6 delete claim 6 in its entirety and substitute new claim 6 as follows:

--6. A system for storing and retrieving one or more design patterns, each of said design patterns provided with at least one design characteristic, comprising:

an input device provided with a comprehensive listing of design characteristics, allowing an individual to limit said comprehensive listing of design characteristics to a grouping of design characteristics less in number than said comprehensive listing of design characteristics, said comprehensive listing of design characteristics including a plurality of color cells, each color cell displaying a base color blended with tints or shades of the base color to create a continuum of said base color;

UNITED STATES PATENT AND TRADEMARK OFFICE
CERTIFICATE OF CORRECTION

PATENT NO. : 5,291,395
DATED : March 1, 1994
INVENTOR(S) : Max Abecassis

It is certified that error appears in the above-indentified patent and that said Letters Patent is hereby corrected as shown below:

a computer provided with a database containing a comprehensive listing of design characteristics and software for determining which of a plurality of design patterns satisfy a particular criteria based upon a grouping of design characteristics inputted to said computer, said computer generating a listing of design patterns which satisfy said particular criteria based upon said grouping of design characteristics inputted to said computer, each design pattern corresponding to a physically textured pattern material; and a storage location associated with said system containing said physically textured pattern materials, each of said physically textured pattern materials associated with a specific indicia and each of said physically textured pattern materials being separated from other physically textured pattern materials, said listing of design patterns and said specific indicia utilized to retrieve said physically textured pattern materials.--

Signed and Sealed this

Sixth Day of September, 1994

Attest:

BRUCE LEHMAN

Attesting Officer

Commissioner of Patents and Trademarks